(12) United States Patent
Durgin et al.

(10) Patent No.: US 6,220,817 B1
(45) Date of Patent: *Apr. 24, 2001

(54) AFT FLOWING MULTI-TIER AIRFOIL COOLING CIRCUIT

(75) Inventors: George A. Durgin, West Chester; Ching-Pang Lee, Cincinnati, both of OH (US)

(73) Assignee: General Electric Company, Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/971,305

(22) Filed: Nov. 17, 1997

(51) Int. Cl.[7] ...................................................... F01D 5/08
(52) U.S. Cl. ........................................ 416/97 R; 415/115
(58) Field of Search ................................... 415/115, 116; 416/97 R, 97 A, 96 A, 96 R

(56) References Cited

U.S. PATENT DOCUMENTS

| 3,017,159 | 1/1962 | Foster et al. ................. 253/39.15 |
| 3,533,711 | 10/1970 | Kercher ................................ 416/90 |
| 4,474,532 | 10/1984 | Pazder .............................. 416/97 R |
| 4,684,322 | 8/1987 | Clifford et al. ...................... 416/95 |
| 4,753,575 | 6/1988 | Levengood et al. ............... 416/97 R |
| 4,820,122 | 4/1989 | Hall et al. ......................... 416/97 R |
| 4,940,388 | * 7/1990 | Lilleker et al. ................... 416/97 R |
| 5,156,526 | 10/1992 | Lee et al. ......................... 416/97 R |
| 5,387,085 | 2/1995 | Thomas, Jr. et al. ............. 416/97 R |
| 5,403,159 | 4/1995 | Green et al. ..................... 416/97 R |
| 5,591,007 | 1/1997 | Lee et al. ......................... 416/97 R |
| 5,660,524 | 8/1997 | Lee et al. ......................... 416/97 R |

FOREIGN PATENT DOCUMENTS 2250548    6/1992   (GB).

* cited by examiner

Primary Examiner—Edward K. Look
Assistant Examiner—Richard Woo
(74) Attorney, Agent, or Firm—Andrew C. Hess; Rodney M. Young

(57) ABSTRACT

A turbine airfoil includes a plurality of internal ribs defining at least two independent serpentine cooling circuits having outer and inner serpentine portions, respectively, in different longitudinal tiers with the outer serpentine position being disposed longitudinally above the inner tier serpentine position for differentially longitudinally cooling the airfoil. The outer and inner serpentine portions include outer and inner exits and entrances wherein the outer and inner exits are positioned aft of the outer and inner entrances, respectively, so as to have a chordal flow direction aftwards from the leading edge to the trailing edge within the serpentine portions.

9 Claims, 2 Drawing Sheets

AFT FLOWING MULTI-TIER AIRFOIL COOLING CIRCUIT

BACKGROUND OF THE INVENTION

1. Field of the Invention

The present invention relates generally to cooling of turbine rotor blades and stator vanes in gas turbine engines and, more specifically, to serpentine cooling circuits therein.

2. Discussion of the Background Art

A gas turbine engine includes a compressor that compresses air which is channeled to a combustor wherein it is mixed with fuel and ignited for generating combustion gases. The combustion gases flow downstream through one or more stages of turbines which extract energy therefrom for powering the compressor and producing additional output power for driving a fan for powering an aircraft in flight for example. A turbine stage includes a row of turbine rotor blades secured to the outer perimeter of a rotor disk, with a stationary turbine nozzle having a plurality of stator vanes disposed upstream therefrom. The combustion gases flow between the stator vanes and between the turbine blades for extracting energy to rotate the rotor disk. Since the combustion gases are hot, the turbine vanes and blades are typically cooled with a portion of compressor air bled from the compressor for this purpose. Diverting any portion of the compressor air from use in the combustor necessarily decreases the overall efficiency of the engine. Accordingly, it is desired to cool the vanes and blades with as little compressor bleed air as possible.

Typical turbine vanes and blades include an airfoil over which the combustion gases flow. The airfoil typically includes one or more serpentine cooling passages therein through which the compressor bleed air is channeled for cooling the airfoil. The airfoil may include various turbulators therein for enhancing cooling effectiveness and, the cooling air is discharged from the passages through various film cooling holes disposed around the outer surface of the airfoil.

The temperature profile of the combustion gases channeled over the airfoil is typically center peaked at about 50% to about 80% of the radial height or span of the airfoil. Secondary flow fields between adjacent airfoils may sometimes cause the temperature profile of the combustion gases to shift radially outwardly on the pressure side of the airfoil. Accordingly, the airfoil typically experiences relatively high heat input loading on its pressure side above the airfoil mid-span. Since the serpentine cooling circuits introduce air into the airfoil from its root, the cooling air must be provided with a suitable flow rate to ensure that the outer portions of the airfoil experiencing the greatest heat input are adequately cooled for obtaining a useful life during operation. The inner portions of the airfoil may therefore be over-cooled which is an inefficient use of the valuable compressor bleed air. To overcome this drawback a "Multi-tier turbine airfoil", disclosed in U.S. Pat. No. 5,591,007, was devised and is incorporated herein by reference. This patent discloses a turbine airfoil having a plurality of internal ribs defining at least two independent serpentine cooling circuits arranged in part in different longitudinal tiers, with an outer tier circuit being disposed in part longitudinally above an inner tier circuit for differentially longitudinally cooling the airfoil. More advanced turbine airfoil designs have been developed that could use a better cooling air distribution.

Typical mid-circuit cooling air, after picking up the heat in the serpentine passage, exits through film cooling holes. One or more rows of film cooling holes are placed on the pressure side and also on the suction side. New highly aerodynamically efficient airfoils in low through flow turbine designs are subject to an external gas path flow along the pressure side that has low velocity. This can result in a very high blowing ratio (mass flux ratio of film cooling air to gas flow) through the film cooling holes and very poor film cooling effectiveness (film blow-off) on the pressure side of the airfoil. Geometrical limitations of at least some of the cavities which supply the film cooling air prevent or make difficult the use of film holes on both pressure and suction sides that have relatively shallow angles from the surfaces of the sides. The use of larger angles would result in significant aerodynamic mixing losses and poor film cooling effectiveness because much of the film cooling air would flow out of the boundary layer. Therefore, it is desirable to have a circuit design which can avoid the use of film cooling in such areas of the airfoil and provide effective and efficient film and convective cooling of the entire airfoil.

SUMMARY OF THE INVENTION

A turbine airfoil includes a plurality of internal ribs defining at least two independent serpentine cooling circuits having outer and inner serpentine portions, respectively, in different longitudinal tiers with the outer serpentine position being disposed longitudinally above the inner tier serpentine position for differentially longitudinally cooling the airfoil. The outer and inner serpentine portions include outer and inner exits and entrances wherein the outer and inner exits are positioned aft of the outer and inner entrances, respectively, so as to have a chordal flow direction aftwards from the leading edge to the trailing edge within the serpentine portions.

The airfoil may include film cooling holes in an outer wall of the airfoil on the suction side of the airfoil and no film cooling holes on a pressure side of the outer wall along a mid-chord portion of the airfoil between the leading and trailing edges.

ADVANTAGES OF THE INVENTION

The present invention provides advantages that include a significant improvement in the cooling of not only, an upper span portion of the turbine airfoil outer wall, but also of a mid-chord portion of the suction and pressure sides of the outer wall. Furthermore, the use of separate leading edge and mid-circuits provides colder cooling air at the upper span portions of the airfoils.

The highly curved or arched contour of the airfoil has span ribs between span channels or cavities nearer to the leading edge that are wider than span ribs between span channels nearer the .trailing edge and, therefore, are also on the average further away from the external hot surfaces of the sides of the outer wall and generally have temperatures closer to the cooling air temperature in the channels. In a downstream wise serpentine circuit design as in the present invention, the cooling air temperature is colder than the cooling air temperature in the same cavities for upstream wise serpentine circuit design. Therefore, a downstreamwise serpentine circuit will have a colder average spanwise rib wall temperature than that of an upstreamwise serpentine circuit and, therefore, have an overall better cooling air temperature distribution in the chordwise direction and a better bulk temperature of the airfoil for better cooling of the entire airfoil.

The two tier circuit design offers additional flexibilities in distributing cooling air in a more efficient manner and also shortens the length of each pass and increases the number of turns which result in a higher heat transfer (cooling) coefficients inside the serpentine passages. The downstreamwise serpentine circuit design also provides an internal cooling air pressure which is more consistent with and tailored to the external gas pressure as the external gas expands in the chordwise or downstream direction through the turbine. This results in a better back flow margin for the blade and a more optimum use of internal cooling potential by trading more pressure consumption for better heat transfer.

Because the outer wall sides closer to the leading edge are cooled by colder fresher air than in those in the prior art, film cooling in this region may not be necessary. This will result in better turbine performance and lower cost in manufacturing. In addition, the film cooling holes closer to the trailing edge can have shallower flow angles from surface than those closer to the leading edge resulting in a better film cooling effectiveness. The external gas flow velocity closer to the trailing edge accelerates to a higher speed than at portions along the airfoil sides closer to the leading edge. Therefore, the airfoil cooling can be better tailored for conductive and convective cooling of portions of the sides of the outer wall closer to the leading edge and film cooling holes may be used for portions of the sides closer to the trailing edge where they will have smaller and, therefore, better blowing ratios and result in a better film cooling effectiveness and overall cooling efficiency.

Generally, design requirements for airfoils at the lower spans are driven by concerns for rupture at high stress levels at reduced metal temperature and at the upper regions by concerns over elevated surface temperature to avoid oxidation and fatigue crack initiation. The multi-tier downstream flowing serpentine design concept addresses these needs with the ability to better optimize cooling flow and blade life.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
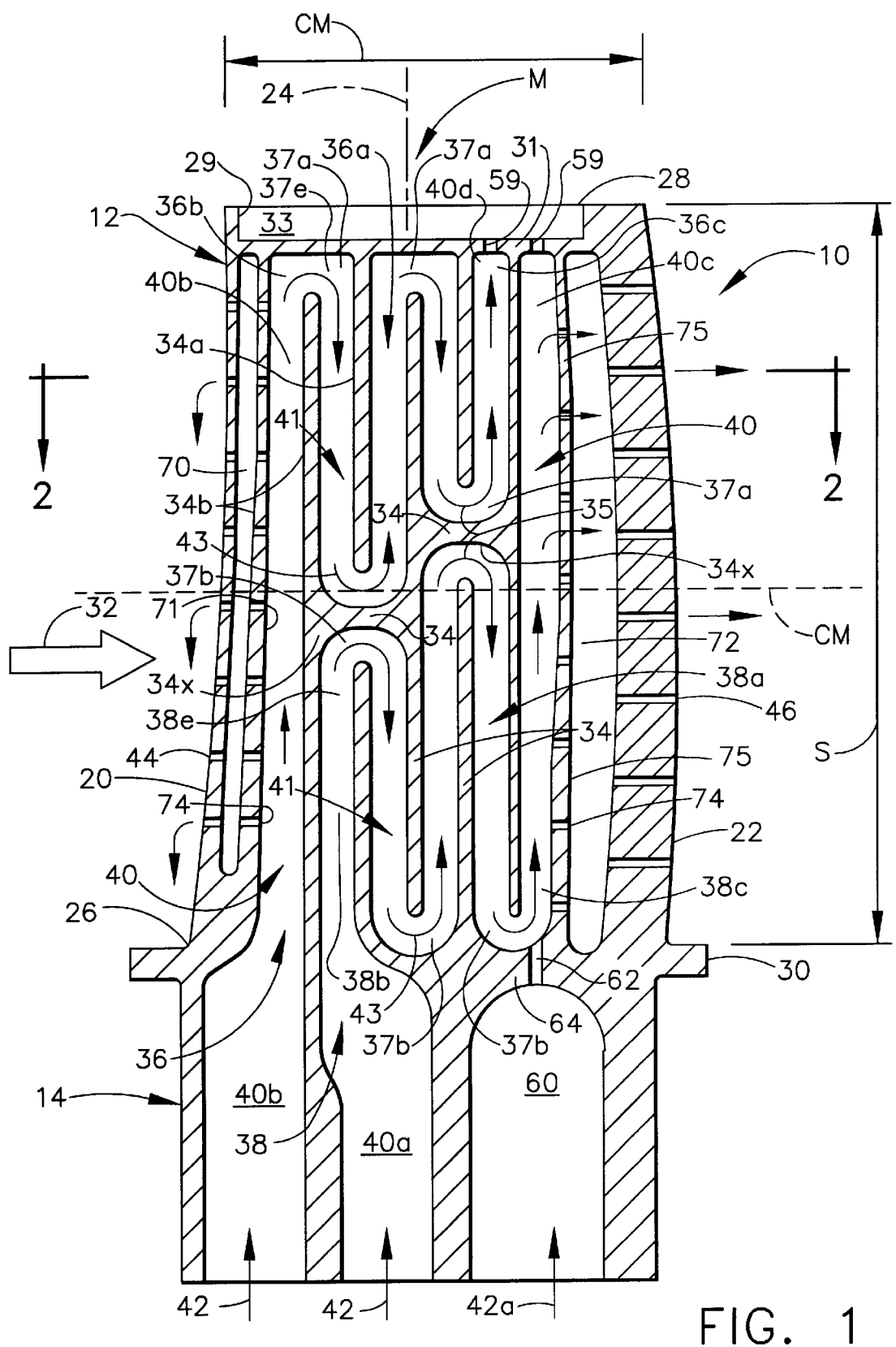
FIG. 1 is a sectional view of an exemplary gas turbine engine airfoil laid out flat along its chord and having multi-tier serpentine cooling circuits with downstream flowing serpentine portions therein.
Figure 2:
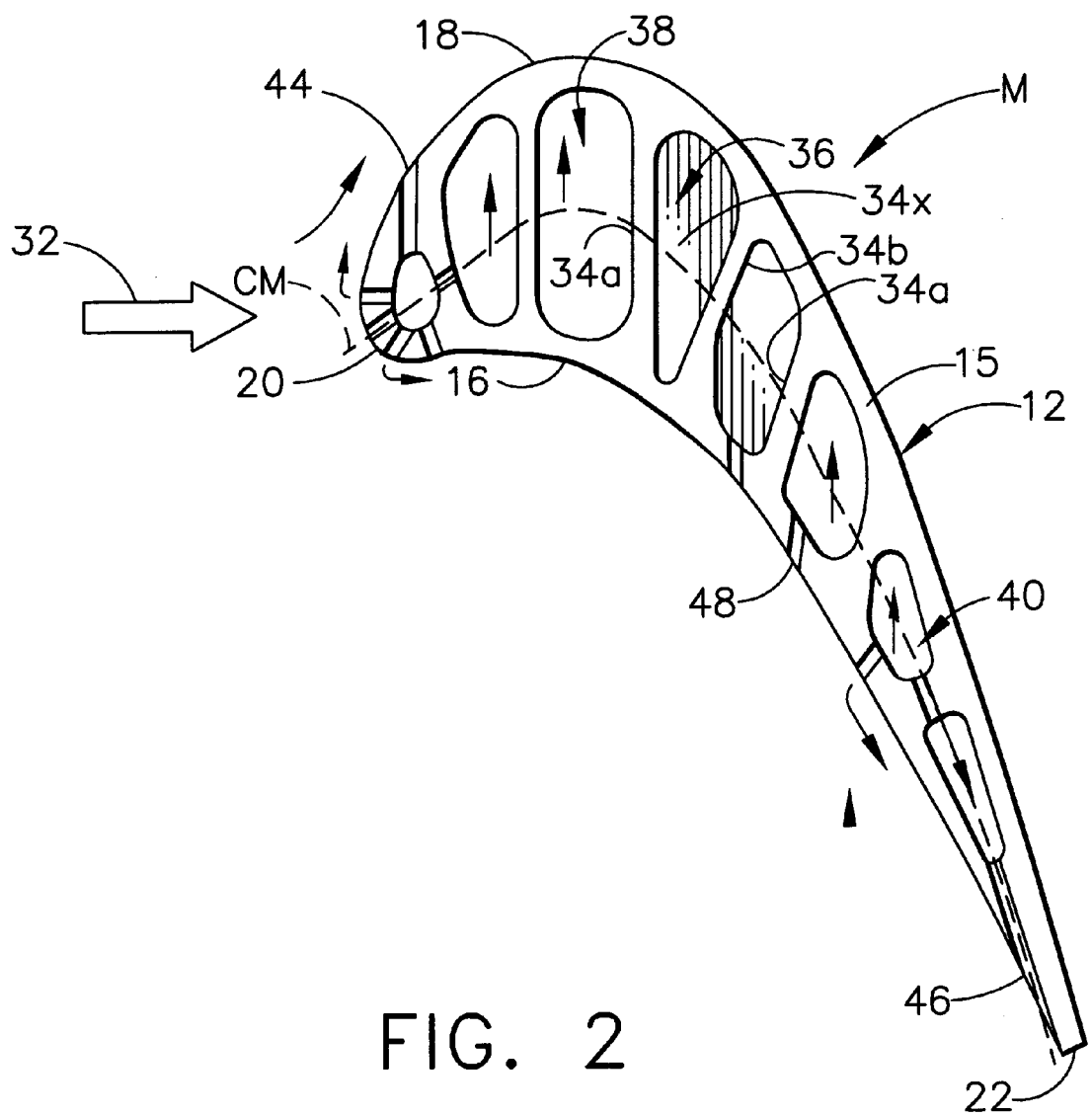
FIG. 2 is a sectional view through the airfoil in FIG. 1 illustrated with an actual curved chord and taken along line 2—2.

Illustrated in FIG. 1 is an exemplary turbine blade 10 for a gas turbine engine. The blade 10 incudes an airfoil 12 and a conventional dovetail root 14 which is used to conventionally secure the blade 10 to a rotor disk of the engine. A cross-section of the airfoil 12 is illustrated in FIG. 2 and shows that the airfoil 12 includes an outer wall 15 with a pressure side 16 and a suction side 18 joined together along an upstream leading edge 20 and a downstream trailing edge 22 which is spaced axially or chordally therefrom. The airfoil 12 extends longitudinally along a longitudinal or radial axis 24 in a spanwise direction of the airfoil 12 from a radially inner base 26 to a radially outer airfoil tip 28 along a span S of the airfoil. The airfoil tip 28 is illustrated as a squealer tip having an outward extension from outer wall 15 or a squealer tip wall 29 extending longitudinally outward from and peripherally around an outer tip wall 31 forming a squealer tip cavity 33 therein. The inner base 26 is defined at a conventional platform 30 which forms the inner flow boundary of the airfoil 12 and below which extends the root 14.

During operation of the blade 10, combustion gases 32 are generated by a combustor (not shown) and flow downstream over both airfoil pressure and suction sides 16 and 18, respectively, of the outer wall 15. The radial or longitudinal temperature profile of the combustion gases 32 typically is center-peaked near a mid-span region above a mid-span chord CM of the airfoil from about 50% to about 80% thereof. Secondary flow fields between adjacent ones of the airfoils 12 may cause the temperature profile to shift radially outwardly over the airfoil pressure side 16 radially outwardly over a range of about 70% to about 85% of the radial height or span of the airfoil 12. Accordingly, the pressure side 16 experiences its greatest heat input or load above the mid-span region in the 70% to 85% span height.

In accordance with the present invention, preferential radial or spanwise cooling of the airfoil 12 is effected to better match the distribution of the heat load thereto from the combustion gases 32. Although an exemplary gas turbine rotor blade 10 is illustrated in the FIGS., the invention applies equally as well to turbine stator vanes having similar airfoils which may be similarly cooled in accordance with the present invention.

More specifically, the pressure and suction sides 16, 18 are spaced circumferentially or laterally apart from each other between the leading and trailing edges 20, 22 and are integrally joined together by a plurality of internal ribs indicated generally at 34 which define at least two independent cooling passages denoted as outer and inner tier cooling circuits 36 and 38, respectively, having outer and inner tier serpentine portions 36a and 38a, respectively, which are disposed generally above and below the mid-span chord CM, respectively. The outer and inner tier serpentine portions 36a and 38a are arranged in differential longitudinal decks or tiers, with the outer serpentine portion 36a being disposed in part longitudinally or radially above the inner serpentine portion 38a for differentially longitudinally cooling the airfoil 12 to better match the applied heat loads from the combustion gases 32. Furthermore, the outer and inner tier serpentine portions 36a and 38a are arranged so as to cause serpentine cooling flow 35 within the respective outer and inner tier serpentine portions with a chordal flow direction 43 aftwards from the leading edge 20 to the trailing edge 22 within the serpentine portions. The outer and inner tier serpentine portions 36a and 38a include outer and inner entrances 36b and 38b and exits 36c and 38c, respectively, which are arranged such that the outer and inner exits are positioned aft of the outer and inner entrances, respectively, to cause the serpentine cooling flow 35 to flow in the chordal flow direction 43 aftwards from the leading edge 20 to the trailing edge 22 to better match the applied heat loads from the combustion gases 32 and to even more effectively tailor the serpentine cooling flows 35 to the heat loading on and more effectively cool the airfoil 12.

The internal ribs 34 illustrated in FIG. 1 are primarily in the form of chordally spaced apart and longitudinally extending short span ribs 34a which define the outer and inner tier serpentine portions 36a and 38a and long span ribs 34b which define a plurality of discrete span channels indicated generally at 40 and serpentine channels indicated generally at 41 which extend longitudinally inside the airfoil 12 for channeling cooling air 42 conventionally received from a compressor (not shown) inside the airfoil 12 for the cooling thereof. The internal ribs 34 also include preferably two or more (though one could suffice), mid-span chord ribs 34x extending chordally between adjacent ones of the short and long span ribs 34a and 34b, respectively, to in part form outer and inner turning channels 37a and 37b, respectively. The outer and inner turning channels 37a and 37b, respectively, connect the span channels 40 and the serpentine channels 41 to form the outer and inner serpentine portions 36a and 38a, respectively. Some of the outer and inner turning channels 37a and 37b, respectively, near the mid-span chord CM are separated by the chordwise extending adjacent chord ribs 34x which may be longitudinally staggered or spaced apart. The staggered arrangement provides an additional advantage because it makes the airfoil stiffer with respect to the first mode of resonance which typically has a line of failure about which the airfoil tends to bend and fail through a mid-span region of the airfoil. Serpentine channels 41 of the outer serpentine portion 36a are preferably longitudinally aligned with corresponding ones of the inner serpentine portion 38a to further stiffen the airfoil 12 and simplify its construction.

In the exemplary embodiment illustrated in the FIGS., the outer and inner tier cooling circuits 36 and 38 are five-pass serpentine circuits.

Substantially, all of the outer tier cooling circuit 36 is disposed directly above a major portion of the inner tier cooling circuit 38 so that the airfoil 12 may be preferentially cooled in its longitudinal or radial direction for better matching the applied heat input from the combustion gases 32 flowing over the airfoil 12 during operation. The outer and inner tier cooling circuits 36, 38 may have any suitable number of serpentine passes as desired.

In the exemplary embodiment illustrated in FIG. 1, the outer and inner tier serpentine portions 36a and 38a are disposed near the mid-chord region M of the airfoil 12 between the leading edge 20 and the trailing edge 22 since experience has shown that the highest heat input in the airfoil 12 is in the mid-chord region near the airfoil tip 28 and on the pressure side 16 for example. In this specific embodiment, the chord ribs 34x are disposed at about mid-span of the airfoil 12 or at about 50% of the radial height. As indicated above in the Background section, the center-peaked temperature profile for the combustion gases 32 along with any radial migration will effect a maximum temperature on the pressure side 16 of the airfoil 12 in the range of about 70% to about 85% of the span height. Accordingly, by positioning the chord ribs 34x at mid-span M, the outer tier cooling circuit 36 extends upwardly to the airfoil tip 28 to provide cooling air directly to this highest heat input region for maximum cooling of the airfoil in this region.

The outer tier cooling circuit 36 further includes one of the span channels 40 which defines an outer inlet channel 40b extending radially upwardly to a first outer one 37e of the outer turning channels 37a. The inner tier cooling circuit 38 similarly includes another one of the span channels 40 defining an inner inlet channel 40a extending radially upwardly to a first inner one 38e of the inner turning channels 37b. The inner tier cooling circuit 38 also includes a third one of the span channels 40 defining an inner outlet channel 40c extending radially upwardly to and culminating at the outer tip wall 31.

A leading edge cooling plenum 70 is formed between a forward most span rib 71 and the leading edge 20 of the outer wall 15. A trailing edge cooling plenum 72 is formed between an aftward most span rib 75 and the trailing edge 22 of the outer wall 15. Cooling air discharge apertures 74 in the forward most span rib 71 feeds cooling air from the outer inlet channel 40b to the leading edge cooling plenum 70 from where it is flowed through conventional leading edge shower head cooling holes 44. Cooling air discharge apertures 74 in the aftward most span rib 75 feeds cooling air from an inner outlet channel 40c to the trailing edge cooling plenum 72 from where it is flowed through conventional trailing edge cooling holes 46. This is used to cool the leading and trailing edges 20 and 22, respectively.

The airfoil may include film cooling holes 48 along both sides of the outer wall 15 or, as in another more specific embodiment illustrated in FIG. 2, may be constructed such that the suction side 18 has no film cooling holes and the pressure side 16 preferably has a plurality of downstream angled film cooling holes 48 in the outer wall 15 along a mid-chord portion of the airfoil between the leading and trailing edges.

Since the airfoil 12 in the exemplary embodiment illustrated in FIG. 1 receives the cooling air 42 from the root 14, the inlet channels 40b and 40a of the outer and inner tier cooling circuits 36 and 38, respectively, extend in lower part parallel to each other to separately feed the cooling air 42 to both the outer and inner tier cooling circuits 36 and 38, respectively.

The airfoil squealer tip is cooled by tip cooling hole 59 in the outer tip wall 31 at locations which lead from the inner outlet channel 40c and the outer outlet channel 40d to the squealer tip cavity 33. Thus, each of the outer and inner tier cooling circuits 36 and 38, respectively, culminate with at least one of the tip cooling hole 59 and provide cooling air to the squealer tip cavity 33. A refresher span channel 60 may be disposed through the root 14 to feed refresher cooling air 42a through at least one refresher hole 62 through a bottom most chord rib 64 between one of the inner turning channels 37b leading to the inner outlet channel 40c to feed additional fresh cooling air to the inner outlet channel and subsequently the trailing edge cooling plenum 72 for supplemental cooling of the trailing edge 22. The outer tip wall 31 also caps the outer most portions of the cooling circuits, channels, and plenums.

One advantage of having each of the outer and inner tier cooling circuits 36 and 38, respectively, culminate with the tip cooling holes 59 downstream of the forward most span rib 71 and the aftward most span rib 75 and their cooling air discharge apertures 74 is that there is always sufficient cooling air to feed the entire spanwise lengths of the leading and trailing edge cooling plenums 70 and 72, respectively. Another advantage of this feature is that the forward most span rib 71 and the aftward most span rib 75 also referred to as the cold bridge and the warm bridge, respectively, remain cooler than in prior art designs so as to more effectively cool the outer wall 15 to which they are attached. This is a more effective cooling design than conventional cold and warm bridge designs which have cooled blades with an up pass which feeds the leading edge and trailing edge cooling air discharge apertures 74 or impingement holes and suction side film cooling holes 48 also referred to as gill holes. Very little coolant is left at the tip of these conventional feed cavities or passages. These bridges and passages also extend and cover a reasonably large surface length for which adequate cooling must be provided.

In the turbine blade embodiment illustrated in FIG. 1, the inlet channels 40a and 40b commence at a common plane below the inner base 26 inside the root 14 for conventionally receiving the cooling air 42. The inner and outer outlet channels 40c and 40d, respectively, terminate at a common plane at the airfoil tip 28. In this way, the two tier cooling circuits 36, 38 are generally coextensive in the longitudinal direction with the outer tier 36 primarily cooling the outer portion of the airfoil 12, with the inner tier cooling circuit 38 primarily cooling the inner portion of the airfoil 12. Since less cooling is required below the blade mid-span, the cooling air 42 delivered to the inner tier cooling circuit 38 may be reduced in amount to only that which is needed for accommodating the lower heat input loads in that region. And, the cooling air 42 introduced into the outer tier cooling circuit 36 may be independently metered for providing a suitable amount of the cooling air 42 for accommodating the higher heat input loads in the upper region of the airfoil. In this way, the airfoil 12 may be preferentially cooled in the radial or longitudinal and axial or chordal directions of the airfoil using less total cooling air 42 where permitted without overcooling those regions as would occur in the prior art. The cooling air 42 is therefore used more efficiently and less cooling air is bled from the compressor for increasing the overall efficiency of operation of the gas turbine engine.

The airfoil 12 may have any other conventional features for enhancing the cooling thereof such as turbulators or pins (not shown) which are well known in the art.

Although the invention has been described with respect to the exemplary turbine blade 10 illustrated in the FIGS., it may also be used for turbine nozzle vanes which have similar airfoils which can benefit from preferential spanwise cooling thereof for better matching the radial applied temperature distribution from the combustion gases 32.

The multi-tier serpentine cooling arrangement described above provides advantages of preferential span-wise and chordwise cooling for optimizing the usage of cooling air and to achieve a more desirable metal temperature distribution of the airfoil 12. Although five-pass serpentine circuits are illustrated in FIG. 1, a three-pass serpentine circuit may also be used for the outer tier cooling circuit 36 depending on the design application and available cooling air pressure. The multi-tier serpentine outer and inner tier cooling circuits 36 and 38 may be readily manufactured using conventional casting techniques as are used for conventional multi-pass serpentine passages.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A gas turbine engine airfoil comprising:
   an airfoil outer wall having pressure and suction side joined together at chordally spaced apart leading and trailing edges of said airfoil and extending longitudinally from a root to a tip;
   said side being spaced apart from each other between said leading and trailing edges and joined together by a plurality of internal ribs defining at least two independent serpentine outer and inner cooling circuits arranged in part in different longitudinal tiers;
   said outer and inner cooling circuits include outer and inner tier serpentine portions respectively wherein said outer serpentine portion is disposed longitudinally above said inner serpentine portion for differentially longitudinally cooling said airfoil;
   said outer and inner serpentine portions include outer and inner exits and entrances wherein said outer and inner exists are positioned aft of said outer and inner entrances respectively so as to have a chordal flow direction aftwards from said leading edge to said trailing edge within said serpentine portions and said inner entrance is aft of said outer entrance;
   said outer and inner serpentine portions include outer and inner turning channels respectively; and
   at least two chordwise extending adjacent chord ribs of said internal ribs disposed between said outer and inner turning channels.

2. An airfoil as claimed in claim 1 wherein chordwise adjacent ones of said chordal ribs are longitudinally spaced apart.

3. An airfoil as claimed in claim 2 wherein said internal ribs further include:
   a plurality of chordally spaced apart and longitudinally extending span ribs defining a plurality of longitudinally extending span channels for channeling cooling air longitudinally inside said airfoil;
   said chord ribs extend chordwise from some of left ones of said span ribs to right ones of said span ribs; and
   at least some of said span channels of said outer serpentine portions are longitudinally aligned with corresponding ones of said span channels of said inner serpentine portions.

4. An airfoil as claimed in claim 1 wherein said suction side has no film cooling holes along a mid-chord portion of said airfoil between said leading and trailing edges.

5. An airfoil as claimed in claim 4 further comprising a second plurality of film cooling holes around said leading edge.

6. A gas turbine engine comprising:
   an airfoil outer wall having pressure and suction side joined together at chordally spaced apart leading and trailing edges of said airfoil and extending longitudinally from a root to a tip,
   said sides being spaced apart from each other between said leading and trailing edges and joined together by a plurality of internal ribs defining at least two independent serpentine outer and inner cooling circuits arranged in part in different longitudinal tiers,
   said outer and inner cooling circuits include outer and inner tier serpentine portions respectively wherein said outer serpentine portion is disposed longitudinally above said inner serpentine portion for differentially longitudinally cooling said airfoil,
   said outer and inner serpentine portions include outer and inner exits and entrances wherein said outer and inner exists are positioned aft of said outer and inner entrances respectively so as to have a chordal flow direction aftwards from said leading edge to said trailing edge within said serpentine portions,
   leading edge and trailing edge cooling plenums along said leading and trailing edges,
   said leading edge and trailing edge cooling plenums having cooling air discharge apertures in said outer wall along said leading edge and trailing edges respectively,
   said leading edge cooling plenum having leading edge feed apertures through a leading edge span rib from an inlet span channel of said outer cooling circuit, and said trailing edge cooling plenum having trailing edge feed apertures through a trailing edge span rib from an outlet span channel of said inner cooling circuit.

7. An airfoil as claimed in claim 6 wherein said inlet span channel of said outer cooling circuit is disposed through said root, and said airfoil further comprises:
   an inlet span channel of said inner cooling circuit disposed through said root,
   a refresher span channel disposed through said root, and
   at least one refresher hole through one of said chord ribs between one of said inner turning channels leading to said outlet span channel and said refresher span channel.

8. An airfoil as claimed in claim 7 further comprising at least a first tip cooling hole disposed through a longitudinally outer tip wall of said tip from said outer exit of said outer serpentine portion and at least a second tip cooling hole disposed through said tip wall from said outer exit of said inner serpentine portion.

9. An airfoil as claimed in claim 8 further comprising a squealer tip having a squealer tip wall extending longitudinally outward from and peripherally around said outer tip wall forming a squealer tip cavity therein.

* * * * *